United States Patent [19]
Fichter, Jr. et al.

[11] 3,883,942
[45] May 20, 1975

[54] METHOD OF PROVIDING A FLUID TIGHT SEAL BETWEEN A THIN WALLED TUBE AND A PISTON

[75] Inventors: Arthur A. Fichter, Jr., Saratoga; Ronald D. Danks; Farrell G. Larsen, both of San Jose; Guy C. Throner, Jr., Saratoga, all of Calif.

[73] Assignee: FMC Corporation, San Jose, Calif.

[22] Filed: Feb. 8, 1974

[21] Appl. No.: 440,946

Related U.S. Application Data

[62] Division of Ser. No. 235,274, March 16, 1972, Pat. No. 3,811,381.

[52] U.S. Cl. .................... 29/446; 29/510; 29/517; 267/65 R
[51] Int. Cl. ............................................. B23p 11/02
[58] Field of Search ............ 29/436, 510, 437, 509, 29/516, 517, 446; 267/64 R, 65 RX; 102/66, 6; 417/554

[56] References Cited
UNITED STATES PATENTS

| | | | |
|---|---|---|---|
| 2,518,097 | 8/1950 | Thornhill | 267/65 R |
| 2,774,446 | 12/1956 | de Carbon | 267/64 R X |
| 2,842,702 | 7/1958 | Titcomb et al. | 29/517 UX |
| 3,066,581 | 12/1962 | Goldbeck | 29/517 UX |
| 3,163,262 | 12/1964 | Allinquant | 267/64 R X |
| 3,316,558 | 5/1967 | Mortensen | 267/64 R X |
| 3,387,850 | 6/1968 | Mastrobattista et al. | 29/446 X |
| 3,537,397 | 11/1970 | Ripley et al. | 102/6 X |
| 3,788,630 | 1/1974 | Koller | 267/65 R |
| 3,801,087 | 4/1974 | Akaike et al. | 29/517 UX |

Primary Examiner—Charlie T. Moon
Attorney, Agent, or Firm—C. E. Tripp; A. J. Moore

[57] ABSTRACT

A smoke spotting cartridge adapted upon ejection to propel a smoke forming chemical or the like high into the air for ease in spotting.

3 Claims, 9 Drawing Figures

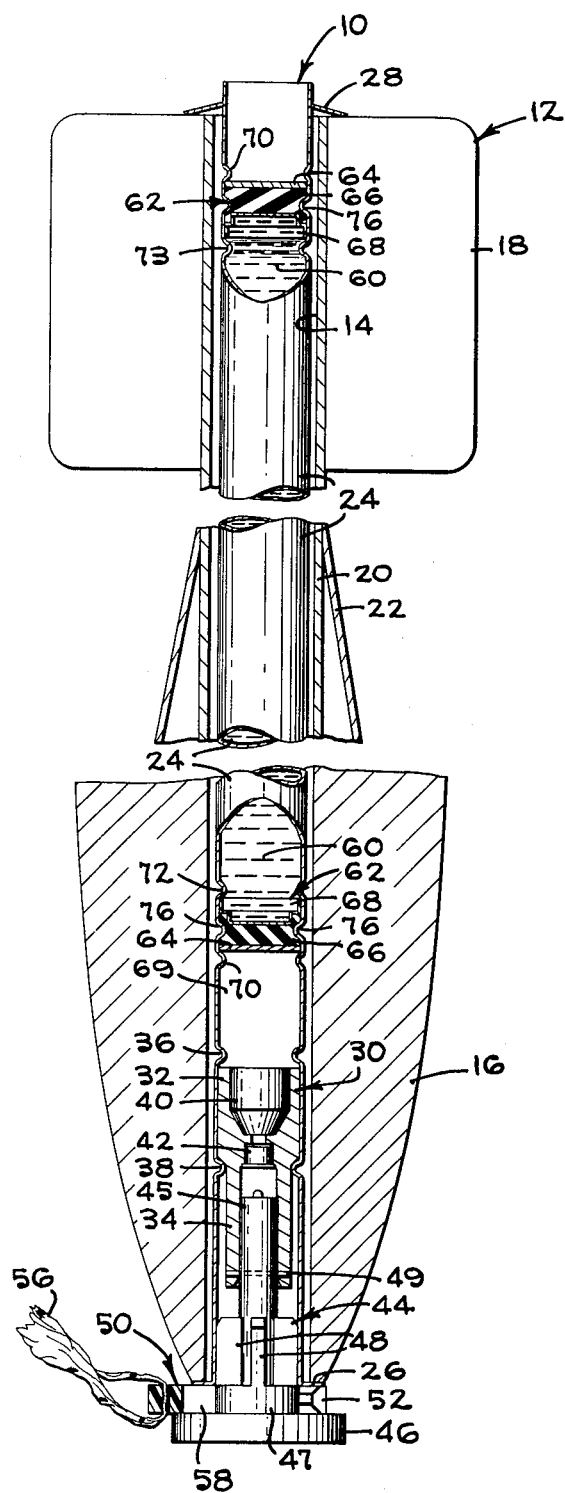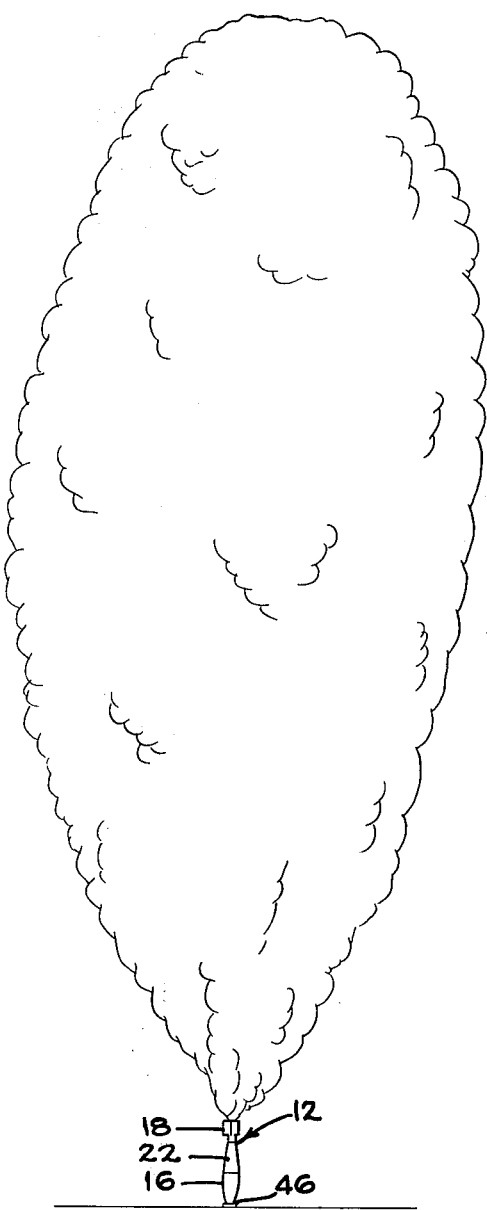

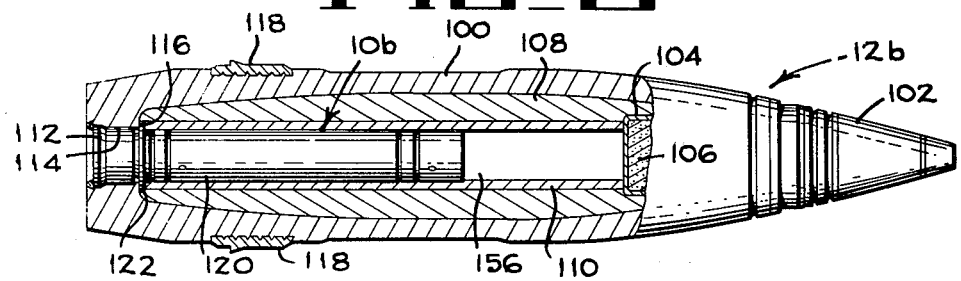
FIG_6
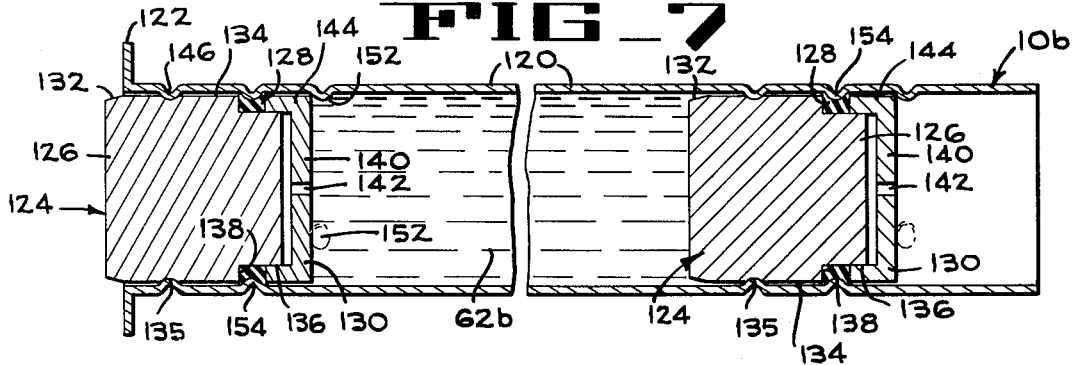
FIG_7
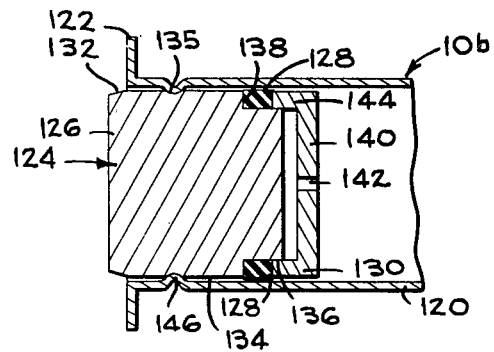
FIG_8
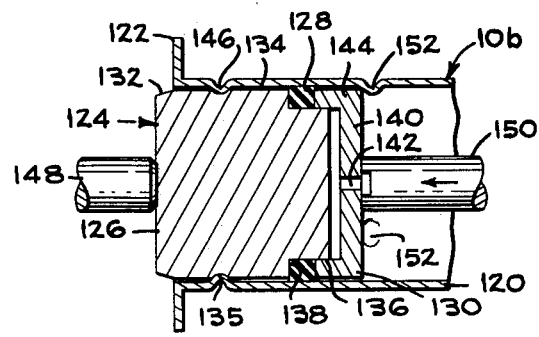
FIG_9

3,883,942

METHOD OF PROVIDING A FLUID TIGHT SEAL BETWEEN A THIN WALLED TUBE AND A PISTON

This is a division, of application Ser. No. 235,274, filed Mar. 16, 1972, now U.S. Pat. No. 3,811,381.

BACKGROUND OF THE INVENTION

1. Field of the Invention

This invention pertains to ordnance equipment and more particularly relates to a smoke bomb or cartridge adapted to eject a smoke forming chemical a substantial distance along a linear path when the cartridge is initiated.

2. Description of Prior Art

Smoke bombs or shells are well known in the art and are used to enable observers to locate the point at which the shell or bomb makes or approaches contact with the target area. The smoke indicates the approximate point of impact of the missile so that the observer can then advise the ground gunners or the appropriate air crew members how to correct their aim.

Certain of the prior art smoke bombs or shells expelled a smoke forming chemical directly from a shotgun shell or the like thereby discharging the chemical at relatively low velocities in several directions outwardly at the point of contact. Thus, if a missile containing the smoke cartridge fell or was fired into soft ground or a snow bank, for example, a large proportion of the smoke forming chemical would be released in this soft material and would not aid the observer in detecting the location of the point of impact. Other known prior art smoke bombs eject burning material rearwardly sometimes causing a fire in surrounding grass or brush.

SUMMARY OF THE INVENTION

The smoke spotting cartridge of the present invention is placed in a missile such as an aerial bomb or shell that is delivered to the target area. Upon approaching or impact with the target area, a propellant charge at the forward end of the cartridge tube is iniated. The tube may have an open rear end or a shear plug in the rear end which is sheared from the missile upon initiation of the propellant. A pair of spaced pistons having the smoke forming chemicals therebetween are held in place within the tube by crimping the tube wall inwardly at appropriate locations. Initiation of the propellant causes both pistons and the smoke forming chemical therebetween to be fired at high velocity out of the rear open end of the tube along a linear path high into the air to greatly aid in spotting the point of impact of the missile. If the cartridge tube is a thin walled tube an air chamber or air gap is preferably provided between the propellant and the first piston to prevent bursting of the thin walled tube.

It is, therefore, one object of the present invention to provide a smoke cartridge arranged to discharge a smoke forming chemical a substantial distance along a linear path from the point of impact of the cartridge.

Another object is to provide an apparatus for releasably holding a corrosive chemical within an open ended tube for subsequent discharge through the open end.

BRIEF DESCRIPTION OF THE DRAWINGS

FIG. 1 is a vertical central section of a missile in the form of an aerial bomb having the smoke cartridge of the present invention mounted therein, certain parts of the missile being cut away.

FIG. 2 is a small scale operational view of the missile of FIG. 1 illustrating the general pattern and height of the smoke when discharged therefrom upon impact at the target area.

FIG. 6 is a missile in the form of a shell with parts broken away to illustrate a third embodiment of the smoke spotting cartridge therein.

FIG. 7 is an enlarged central section taken through the cartridge of FIG. 6.

FIGS. 8 and 9 are operational views illustrating progressive steps of connecting one of the pistons in fluid tight engagement to the wall of the cartridge tube.

DESCRIPTION OF THE PREFERRED EMBODIMENT

Figure 3:
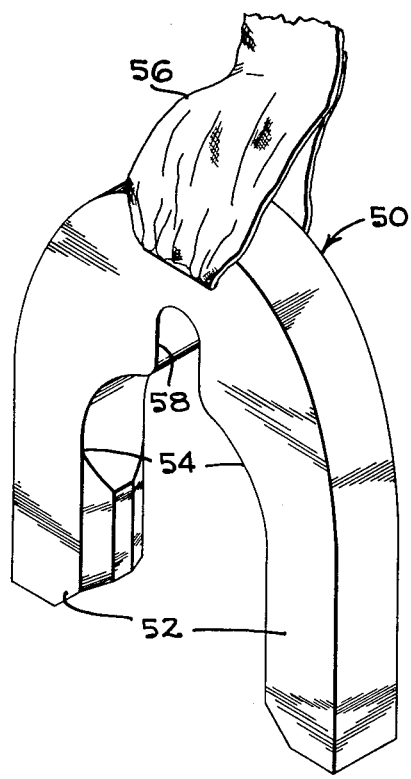
FIG. 3 is an enlarged perspective of a safety clip to prevent accidental firing of the smoke cartridge.

The smoke spotting cartridge 10 (FIG. 1) of the first embodiment of the invention is positioned within a missile 12 which is illustrated as an aerial bomb in FIGS. 1 and 2. The missile 12 has a linear bore 14 therein and includes a weighted forward end 16 connected to a tail fin assembly 18 by a tubular body 20 and an outer housing 22 (FIG. 2) all as is conventional in the art. Although the bore 14 illustrated in FIG. 1 has an open rear end, it will be understood that this opening may be closed by a shear plug which is released upon initiation of the propellant of the cartridge 10. Such plugs (not shown) are commonly used on shells fired from guns.

The smoke spotting cartridge 10 (FIG. 1) includes an open ended thin walled tube 24 that has its forward end formed as a flange 26. The tube is inserted into the bore 14 of the missile and is held in place by the flange 26 and a frusto-conical spring washer 28 at the rear end of the missile.

A pressure generator assembly 30 includes a large diameter body portion 32 and a small diameter tubular neck 34, and is held within the tube 24 by crimping the walls of the tube 24 inwardly at 36 and 38. A propellant charge 40 is received in a large diameter bore in the body 32 and is initiated by a primer or cap 42 that is seated in a smaller bore in the body 32.

A firing pin assembly 44 includes a firing pin 45 slidably received in the tubular neck 34 and a relatively large diameter impact head 46 on the forward end of the firing pin. The assembly 44 also includes a small diameter shoulder 47 and guide fins 48, which fins are slidably received within the forward end of the tube 24. A small diameter aluminum shear pin 49 is received in holes in the neck 34 and firing pin 45 for normally holding the parts in the position illustrated in FIG. 1.

In order to prevent rearward movement of the firing pin assembly 44 and accidental firing on the cartridge, a safety clip 50 (FIGS. 1 and 3) is releasably positioned between the forward flange 26 of the tube 24 and the mpact head 46 of the firing pin 44. The clip 50 is preferably of resilient high impact strength nylon although other plastics or metals may be used. As shown in FIGS. 1 and 3, the clip 50 is somewhat U-shaped and has legs 52 and an opening 54 therein that receives the shoulder 47 of the firing pin assembly. The distance between the adjacent surfaces of the open ends of the legs 52 is less than the diameter of the shoulder 47 and, accordingly, the clip is clamped on the shoulder 47 and must be deflected in order to be removed from the firing pin assembly. Any suitable arming cord 56 or the like is connected to a hole in the safety clip 50 and may be manually gripped when it is desired to arm the cartridge so as to pull the safety clip 50 free from the firing pin assembly 44. A notch 58 is provided in the closed end of the U-shaped clip for reducing the force necessary to allow the legs to resiliently spring outwardly as the safety clip is pulled from the firing pin.

Figure 4:
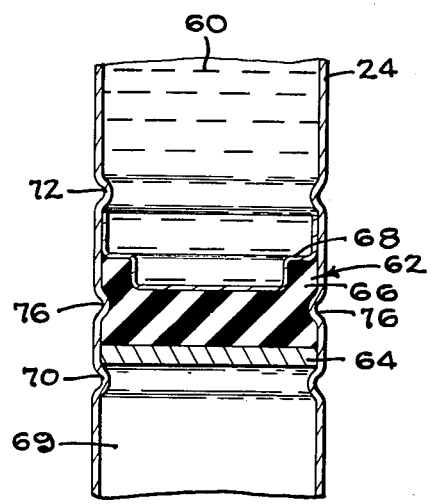
FIG. 4 is an enlarged detail of one of the chemical retaining pistons.

A supply of smoke forming chemical 60 is confined within the tube 24 by a pair of pistons 62 (FIGS. 1 and 4). The preferred smoke forming chemical is liquid titanium tetrachloride which reacts with water vapor in the air to form what is generally known in the art as "cold smoke." Each of the two pistons 62 (FIG. 4) comprises a rigid backing plate or disc 64, a resilient sealing member 66 in the form of a cup, and a rigid sealing cup 68. It will be noted, however, that when installed in the tube 24, the rigid cups 68 of the seals are facing each other so as to contact the smoke forming chemical 60. Each resilient sealing member 66 is preferably a type of viton rubber which is a fluoro-carbon rubber and does not react with titanium chloride. A feature of the invention is that a discreet air chamber or air gap 69 is provided between the pressure generator 30 and the forward piston 62 so that the peak pressure generated within the tube 24 will be cushioned thereby preventing rupture of the thin walled tube 24.

Another feature of the invention is that each piston 62 (FIG. 4) is held in the desired position in the tube 24 by rolled crimps or annular grooves 70 formed in the tube in positions to engage the backing disc 64. Rolled crimps or grooves 72 are also formed in the tube 24 in position to engage the rigid cup 68 of the forward piston 62, and an annular groove 73 is provided to hold the rigid sealing cup 68 of the rear piston 62 in place. As will be apparent from FIG. 1, the annular groove 73 directs the liquid chemical 60 toward the center of the cup 68 upon initiation of the cartridge thus minimizing edge leakage and providing better control of the movement of the rear piston out of the tube 24 upon ejection.

After the rigid backing plate and cup of each piston 62 has been properly positioned in th tube 24 as above described, an annular crimp or groove 76 is formed in the tube and presses into the deformable resilient material of the sealing member 66 thereby providing a fluid tight seal between the tube and the associated piston 62.

In operation, the missile or bomb 12 with the smoke spotting cartridge 10 mounted therein is loaded into an aircraft and the safety clip 50 is pulled therefrom to arm the missile. The missile is then dropped upon the target area shearing the aluminum shear pin 49 and causing the firing pin assembly 44 to move rearwardly to activate the primer or cap 42. The primer initiates the expelling charge 40 which creates a force that is cushioned by the air gap 69 thereby precluding bursting of the thin walled tube 24. As the propelling pressure builds up within the air gap 69, the force applied to the forward piston is transmitted to the rear piston by the incompressible liquid titanium tetra-chloride disposed therebetween. The expelling force is sufficient to propel both pistons 62 and the column of titanium tetra-chloride as a unit out of the open rear end of the tube at high velocity along a linear path that is coincident with the longitudinal axis of the cartridge 10. Movement of the pistons 62 out of the tube will bend the annular grooves 70, 72, 73 and 76, outwardly.

When a cartridge 10 having a diameter of about three-fourths of an inch is used, the smoke forming chemical is propelled at high velocity upwardly to provide a smoke cloud that is shaped as illustrated in FIG. 2 having a height of about 30 feet and a diameter between about 10–15 feet at its wide point.

Figure 5:
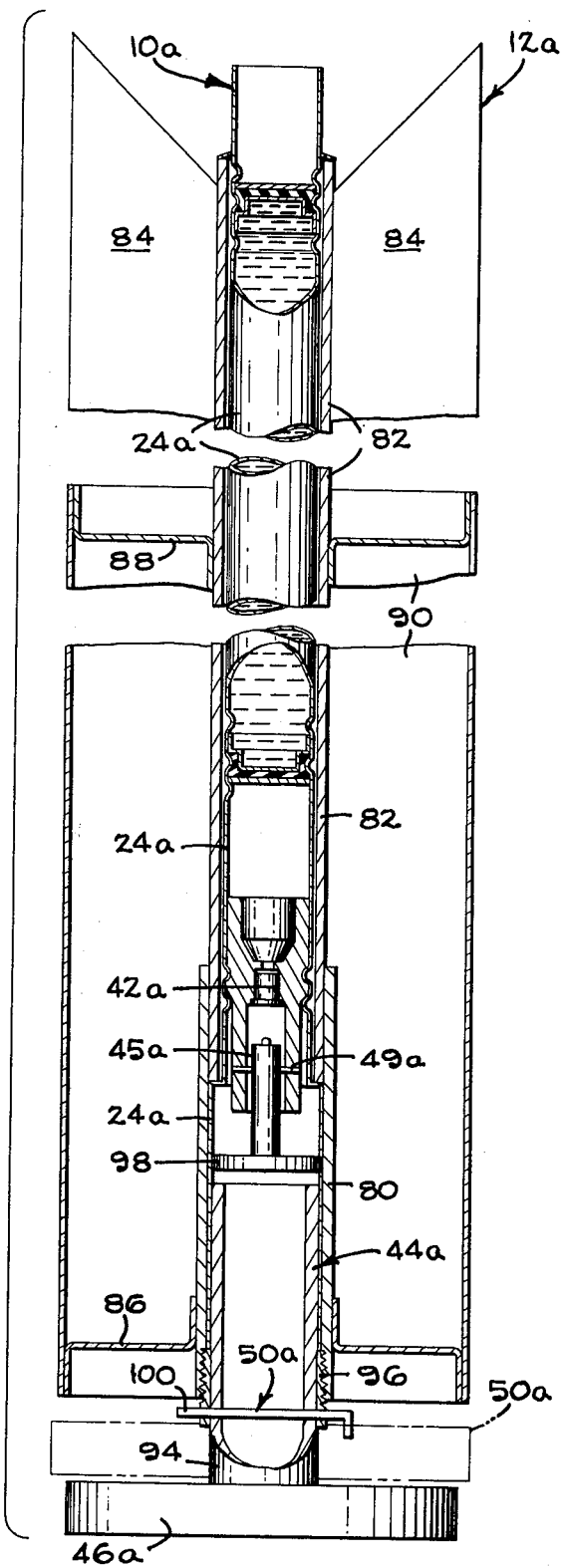
FIG. 5 is a vertical central section of a missile in the form of a standard target bomb, with a second embodiment of the smoke spotting cartridge therein, certain parts being cut away.

The smoke spotting cartridge 10a (FIG. 5) of the second embodiment of the invention is quite similar to that of the first embodiment but is adapted for use in a missile 12a in the form of a similar practice bomb. Because of the similarity between the cartridge 10 and 10a, the components of the cartridge 10a that are equivalent to parts of the cartridge 10 will be assigned the same numerals followed by the letter a.

The practice missile 12a comprises a large diameter forward tube 80 rigidly connected with a smaller diameter rear tube 82 having tail fins 84 secured to its aft end. A pair of spaced flanged discs 86 and 88 are welded to the tubes 80 and 82, respectively and to a large diameter tubular housing 90 to define a hollow body at the forward end of the missile 12a.

A firing pin assembly 44a includes a wide impact disc 46a that is secured to a tubular stem 94 which is slidably received within a threaded sleeve 96 in the forward end of the tube 80.

The sleeve 96 and stem 94 are drilled to receive an aluminum shear pin 50a thus preventing rearward movement of the firing pin assembly 44a until the shear pin 50a is sheared at impact. Rearward movement of the sleeve 94 engages a firing pin disc 98, shears a shear pin 49a that normally holds the firing pin 45a spaced from the cap 42, and thereby causes the firing pin 45a to initiate the cartridge 10a.

The smoke spotting cartridge 10a also differs from the cartridge 10 in that its overall length is shorter, and that the forward end of the tube 24a is expanded outwardly to be confined axially between the smaller tube 82 and the aft end of the threaded sleeve 96. As is apparent in FIG. 5, the enlarged diameter firing pin disc slides within the enlarged diameter of the tube 24a as above mentioned upon rearward movement of the sleeve 94. In order to prevent premature rearward movement of the sleeve 94, a safety clip 50a' is disposed between the lower edge of the tube 80 and the impact disc 46a and may be similar to the clip illustrated in FIG. 30. The safety clip 50a' is, of course, removed from the missile before the missile is released from the aircraft.

The operation of the missile 12a and its smoke spotting cartridge 10a is substantially the same as that described in the first embodiment of the invention except that the wide impact disc 46a of the firing pin assembly 44a provides for more reliable initiating when dropped into snow or the like.

The smoke spotting cartridge 10b (FIGS. 6–9) of the third embodiment of the invention is adapted for use in a missile 12b in the form of a shell propelled from a gun.

The missile or shell 12b (FIG. 6) is of standard well known construction and includes a tubular body 100 having a standard military fuze 102 screwed on its forward end. The fuze 102 may either be a time fuze, a proximity fuze, a combination fuze, or an impact fuze all of which are well known in the art; and each of which includes a booster 104 and a propellant charge 106. A plaster lining 108 and a removable sleeve 110 are disposed within the missile body 100. A shear plug 112 is releasably secured to the rear end of the body 100 within a bore 114 that is smaller in diameter than the outer diameter of the sleeve 110 thus defining an annular shoulder 116. The shell 12b also includes the usual copper rifling sleeve 118 on its outer periphery.

The smoke spotting cartridge 10b (FIG. 7) includes a thin walled tube 120 having a flanged rear end 122. A supply of smoke forming chemical 62b is confined within the tube 120 by a pair of pistons 124. Each piston 124 comprises a disc or plug 126, a deformable sealing member or ring 128 and a rigid sealing cup 130. The plug 126 and cup 130 are preferably aluminum, and the resilient sealing ring 128 is normally of rectangular cross section and is preferably viton rubber. Each plug 126 includes a chamfered rear end 132, a large diameter portion 134 having an annular groove 135 therein, and a small diameter portion 136 upon which the deformable sealing ring 128 is supported for engagement against a flange 138 defined between the large and small diameter portions 136 of the plug 126. Each sealing cup 130 includes a flat wall 140 having an air hole 142 therein and a cylindrical wall 144 which slidably fits within the tube 120 and around the small diameter portion 136 of the plug 126.

During assembly of the rear piston 124 in the tube 120, the plug 126, sealing ring 128 and cup 130 are slid into the rear end of the tube 120. The plug is locked in place by providing a rolled annular crimp 146 in the surface of the tube, which annular crimp enters the groove 135 to removably lock the plug to the tube as illustrated in FIG. 8. A compressive force is then applied by tools 148 and 150 (FIG. 9) against the plug 126 and cup 130 to compress the sealing ring 128 and force it outwardly into firm engagement with the wall of the tube 120. Either spaced dimples 152 or an annular crimped groove is formed in the wall of the tube in position to engage the edge of the cup 130 to hold the rear piston 124 in the compressed position of FIG. 9. An annular groove 154 (FIG. 7) is then rolled in the tube 120 to engage the resilient deformable ring 128 thereby assuring that the rear piston is seated in fluid tight engagement with the tube 120.

A measured quantity of smoke forming chemical 62b is then filled into the tube 120 and the upper or forward piston 124 is slid into the tube. The forward piston is sealed to the tube in the same manner as the rear piston with the exception that the compressive force applied to the forward piston by the tool 150 is resisted by the tool 148 acting through the rear piston and the uncompressible liquid smoke forming chemical 62b.

After the smoke spotting cartridge 10b has been formed as above described and as illustrated in FIG. 7, the cartridge 10b is slid into the missile sleeve 110 (FIG. 6). The sleeve 110 and cartridge are then slid as a unit into the open forward end of the shell. The flanged rear end 122 of the tube 120 seats against the shoulder 116 of the missile body 100 and the rear end of the rear piston plug 126 seats against the forward end of the shear plug 112. The fuze 102 is then screwed in place with the booster 104 contacting the forward end of the sleeve 110. It will be noted that an air gap 156 is provided between the forward end of the cartridge 10b and the rear end of the booster 104.

In operation of the third embodiment of the invention, the shell or missile 12b is propelled from a gun in the usual manner. If the fuze 102 is a time fuze or a proximity fuze, the propellant charge 106 will be activated while the missile is in flight. The propellant will force the shear plug 112 to shear off the body of the missile allowing the pistons 124 and smoke forming chemical 62b to be discharged as a unit from the rear end of the missile along the flight path of the missile. If the fuze is an impact fuze, the cartridge 10b will, of course, propel the smoke rearwardly of the missile upon contact of the missile with the target area as in the other embodiments of the invention.

Although the specification has referred to the confined chemical as being a "smoke forming chemical," it will be understood that the term "smoke forming chemical" appearing in the specification and claims includes equivalent materials such as colored marking dye or the like.

From the foregoing description it is apparent that the spotting cartridge of the present invention upon being initiated is adapted to eject a smoke forming chemical a substantial distance in a linear direction parallel to the longitudinal axis of the cartridge either at the point of impact or while the missile is in flight. The cartridge includes improved means for sealing a smoke forming chemical within a thin walled tube by means of deforming the tube against a pair of chemical confining pistons. The cartridge also includes a discreet air chamber or air gap between an explosive charge and the piston confined chemicals for preventing rupture of the tube upon detonation of the explosive charge.

Although the best mode contemplated for carrying out the present invention has been herein shown and described, it will be apparent that modification and variation may be made without departing from what is regarded to be the subject matter of the invention.

We claim:

1. A method of providing a fluid tight seal between a thin walled tube and a piston which includes a pair of relatively moving rigid members with a deformable member disposed therebetween comprising the steps of; inserting the piston member into the tube, applying a compressive force to the rigid members to move the rigid members toward each other to radially expand the deformable member against the internal surface of the tube, deforming the tube for releasably locking each of the rigid members in their compressed positions to the tube, and inwardly annularly crimping the walls of the tube against the compressed deformable piston member to radially compress a portion of the deformable piston member to provide a fluid tight seal.

2. A method according to claim 1 wherein said compressive forces are applied to the rigid members by inwardly deforming portions of the tube against opposed edges of the rigid members.

3. A method according to claim 1 wherein the steps occur in the following order: first, deforming the tube against one of the rigid members to releasably lock the member to the tube, then applying the compressive force to the rigid piston members, thereafter deforming the tube to lock the other rigid member is position which compresses and radially expands the deformable piston member, and finally applying the inward annular crimp against the deformable piston member.

* * * * *